Dec. 27, 1927.  1,654,381
T. W. MURPHY ET AL
SPRAYING NOZZLE
Filed Sept. 23, 1925    3 Sheets-Sheet 1
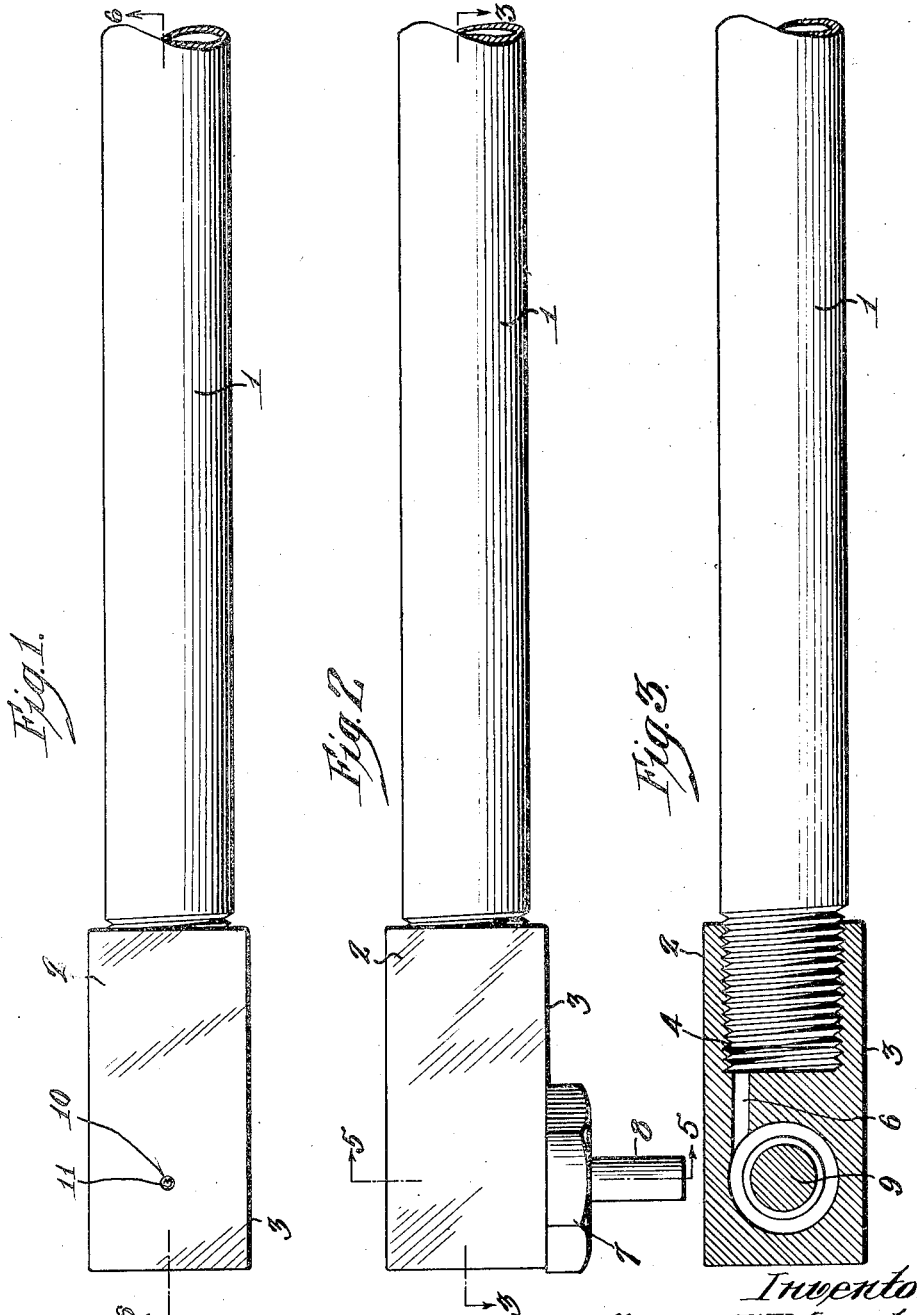

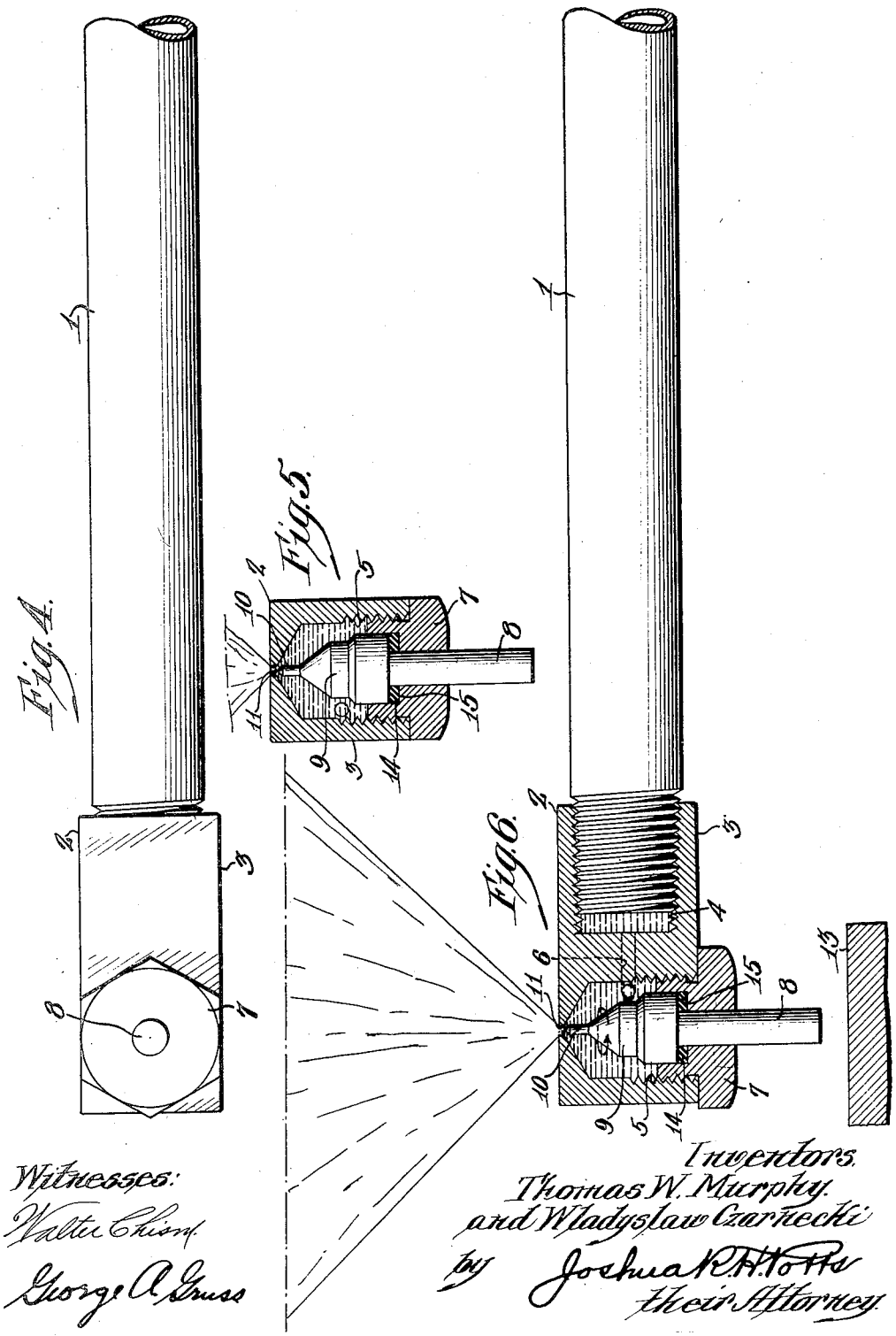

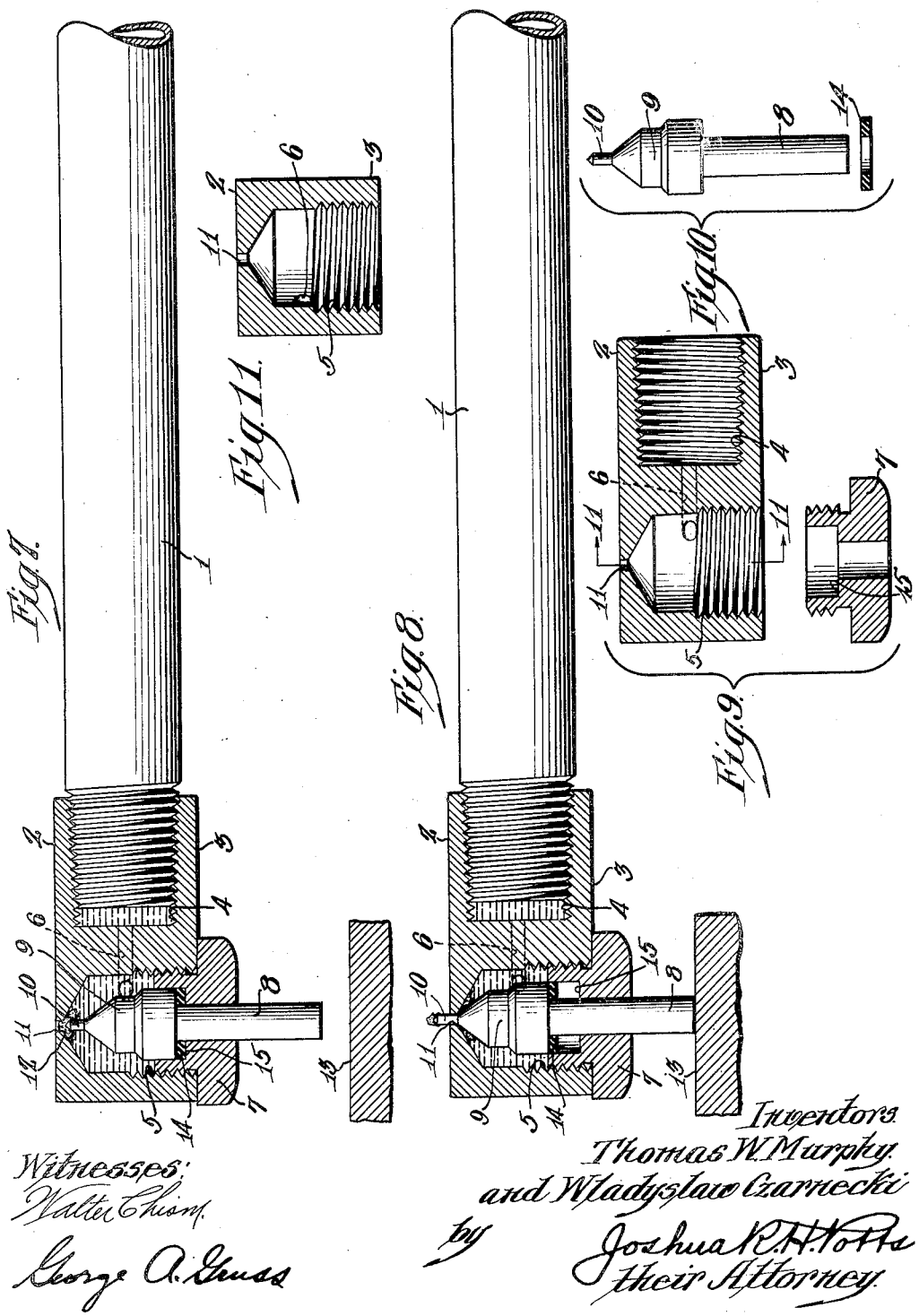

Patented Dec. 27, 1927.

1,654,381

UNITED STATES PATENT OFFICE.

THOMAS W. MURPHY, OF DELAIR, NEW JERSEY, AND WLADYSLAW CZARNECKI, OF PHILADELPHIA, PENNSYLVANIA, ASSIGNORS TO MONARCH MANUFACTURING WORKS, INC., OF PHILADELPHIA, PENNSYLVANIA.

SPRAYING NOZZLE.

Application filed September 23, 1925. Serial No. 58,082.

Our invention relates to spraying nozzles which are adapted for use in spraying trees, plants, soil, etc.

The objects are to provide a nozzle which requires less fluid pressure to produce a large, fine spray of practically uniform density than is necessary by prior nozzles; to provide a nozzle which, when clogged, may be quickly cleaned; a nozzle in which the danger of injuring the cleaning element during the cleaning action is eliminated; and which is so designed that it may be quickly machined on automatic metal cutting machines and thus produced at low cost.

These objects, and other advantageous ends which will be described hereinafter, we attain in the following manner, reference being had to the accompanying drawings in which Figure 1 is a plan view of a nozzle made in accordance with our invention, Figure 2 a side view of the nozzle shown in Figure 1, Figure 3 a horizontal section on line 3—3 of Figure 2, Figure 4 a bottom plan view of the nozzle shown in Figure 2.

Figure 5 a section on line 5—5 of Figure 2,

Figure 6 a section on line 6—6 of Figure 1, showing the nozzle in spraying action, Figure 7 a view similar to Figure 6 showing the nozzle clogged with solid matter, Figure 8 a view similar to Figure 7 showing the cleaning element brought into action to clean the clogged nozzle, Figures 9 and 10 detail views of the nozzle shown in Figure 8, and Figure 11 a section on line 11—11 of Figure 9.

Referring to the drawings, 1 indicates a conduit and 2 our improved nozzle secured to the conduit. The nozzle has a body 3, made of square bar stock, which has a longitudinally threaded hole 4 in one end and a threaded transverse hole 5 in one of its sides at the other end communicating with the hole 4 through an inlet passage 6. This passage enters hole 5 at its periphery and is nearly tangent thereto so that the liquid passing into the hole will be swirled around against its circular wall. The lower end of hole 5 is closed by a nut 7 to form a swirling pot for the liquid. The nut slidably carries a plunger 8, which has its lower end extending out of nut 7 and its upper end provided with a displacement member 9, the upper end of which is conical and terminates in a cleanout stem 10. The liquid in the center of the swirling pot is displaced by member 9 which reduces the volume of water in the pot without sacrificing the space necessary for efficient swirling. Less pressure is required to swirl the liquid filling the space between the displacement member and the sides of the swirl pot, than would be required if the pot was filled with liquid entirely. The upper end of the swirling pot tapers upwardly to form a cone and a discharge opening 11 is provided at the apex from which the water issues in a spray. When this opening is clogged by solid matter, such as indicated at 12 in Figure 7, the lower end of plunger 8 is struck against an object 13 to cause stem 10 to force the solid matter out of opening 11 as shown in Figure 8. The cross sectional area of the plunger being greater than the cross sectional area of the stem, causes the plunger to be forced outwardly by the pressure of the liquid and thus withdraw the stem from opening 11. A gasket 14 is placed between the displacement member 9 and a bottom face 15 of a recess in nut 7. The pressure tending to force the plunger outwardly compresses the gasket and forms a seal against leakage around the plunger.

In spraying, the liquid passes under pressure from conduit 1 through passage 6 into the swirling pot formed by hole 5 and nut 7. Passage 6, being disposed tangentially or nearly so to the periphery of the swirling pot, causes the jet of liquid coming therefrom to swirl the liquid around the displacement member 9. As the liquid leaves discharge opening 11, the centrifugal force created causes it to spread into a spray as shown in Figure 6. Due to the displacement member 9 allowing but a small quantity of liquid to fill the swirling pot, less pressure is required to swirl this liquid.

Should solid matter clog opening 11, as shown at 12 in Figure 7, the opening may be quickly cleaned by striking plunger 8 against any object 13. This will slide plunger 8 into the nozzle and will force stem 10 against the solid matter and the solid matter out through opening 11, as shown in Figure 8. Plunger 8 is forced outwardly by the pressure of the liquid and thus withdraws stem 10 from opening 11. Cleaning opening 11 in this manner, avoids striking stem 10 against an object and injuring the same, as is the case with the prior nozzles. The tendency of the liquid pressure to force the plunger outwardly compresses gasket 14 and forms a seal against leakage around the plunger.

By making the body of the nozzle of square bar stock, the cost of producing the nozzle is considerably reduced, because the square stock may be readily machined by automatic screw machines and the flat sides of the square bar provide enough material on the bar into which holes 4 and 5 may be drilled. The flat side around opening 5 provides a flat face against which nut 7 may bear, thus eliminating a hole facing operation in the manufacture.

It will be seen that by displacing the liquid in the swirling pot, less pressure is required to swirl and force the liquid through the nozzle and that a clogged discharge opening may be quickly cleaned without danger of injuring the cleaning element.

While we have described our invention as taking a particular form, it will be understood that the various parts may be changed without departing from the spirit thereof, and hence we do not limit ourselves to the precise construction set forth, but consider that we are at liberty to make such changes and alterations as fairly come within the scope of the appended claims.

We claim:—

1. A spraying nozzle including a body having a longitudinal hole in one end, a transverse hole in the other end, an outlet leading from the transverse hole, a passage connecting the longitudinal and transverse holes and being disposed at a tangent to the periphery of the transverse hole; an apertured and counterbored nut for closing the open end of the transverse hole; a displacement member centrally disposed in the transverse hole and slidably mounted in the counterbore of the nut; a cleaning stem, of slightly less diameter than the outlet, on the displacement member on the side thereof nearest, and aligning with, the outlet; a plunger on the displacement member extending through the hole in the nut whereby striking the plunger on an external object will force the stem through and clean the outlet; means for sealing the nozzle against leakage; and means for connecting the longitudinal hole with a conduit carrying liquid under pressure.

2. A spraying nozzle consisting of a piece of material in the form of an oblong having a hole longitudinally disposed with respect to the oblong in one end, a hole transverse thereto in the other end, an outlet leading from the transverse hole, a passage connecting the longitudinal and transverse holes and disposed at a tangent to the periphery of the transverse hole, a counterbored nut for closing the open end of the transverse hole, a displacement unit having a cleaning member, of slightly less diameter than the outlet on the side thereof nearest, and in alignment with, the outlet and a plunger extending through the nut, the unit being normally held in position by and having a slidable fit within the counterbored portion of the nut, and forced therefrom when the plunger is struck to push the cleaning member into the outlet, the unit being adapted to slide to its normal position within the counterbore by liquid pressure in the transverse hole.

3. A spraying nozzle having an opening therein with an outlet at one end and a counterbored part closing the other end, means within said opening slidably fitting within the counterbore and having an arm extending through said part, said means having a stem on the side thereof nearest the outlet for cleaning the outlet, whereby upon actuating the arm the stem will be forced through the outlet, whereupon pressure of liquid within the opening will cause said means to slide back within the counterbore and withdraw the stem from the outlet.

4. A spraying nozzle including a body provided with a cylindrical chamber, an outlet from the chamber, and an inlet entering the chamber at a tangent to its periphery; an apertured nut closing the open end of the chamber; a displacement member within the chamber having a stem aligning with and of smaller diameter than the outlet, said member being of materially greater diameter than the stem and having a plunger slidable within the nut; a counterbored portion in the nut; a washer within the counterbored portion having an inner flat bottom, said member slidably fitting within the counterbore whereby, upon the forcing of the displacement member toward the nut by liquid pressure in the chamber, said washer will be pressed between the member and the inner flat bottom of the counterbore to prevent water leaking through the nut; and means for connecting the inlet with a conduit.

5. A spraying nozzle including a body having a longitudinal hole in one end, a transverse hole in the other end, an outlet leading from the tranverse hole, and a passage connecting the longitudinal and transverse holes and being disposed at a tangent to the periphery of the transverse hole; a counterbored nut for closing the open end of the transverse hole; a displacement member centrally disposed in the transverse hole and normally extending into and having a slidable fit within the counterbored portion, said member having a plunger projecting through the nut and being so shaped and positioned with respect to said outlet that it may be moved from its normal position to clean the outlet and moved back to its normal position by liquid under pressure in the transverse hole; and means for connecting the longitudinal hole to a conduit carrying liquid under pressure whereby the liquid will be swirled about the displacement member in the transverse hole and discharged through the outlet in the form of a spray.

6. A spraying nozzle including a body having a longitudinal hole in one end, a transverse hole in the other end, an outlet leading from the transverse hole, a passage connecting the longitudinal and transverse holes and being disposed at a tangent to the periphery of the transverse hole; an apertured and counterbored nut for closing the open end of the transverse hole; a displacement member slidably fitting within the counterbore and having a stem, of slightly less diameter than the outlet, extending therefrom on the side nearest the outlet and in alignment therewith, and a body portion of materially greater cross-sectional area than the stem centrally disposed in the transverse hole; and means for connecting the longitudinal hole to a conduit carrying liquid under pressure whereby the liquid will be swirled about the displacement member in the transverse hole and discharged through the outlet in the form of a spray.

In testimony whereof we have signed our names to this specification.

THOMAS W. MURPHY.
WLADYSLAW CZARNECKI.